Patented Jan. 23, 1923.

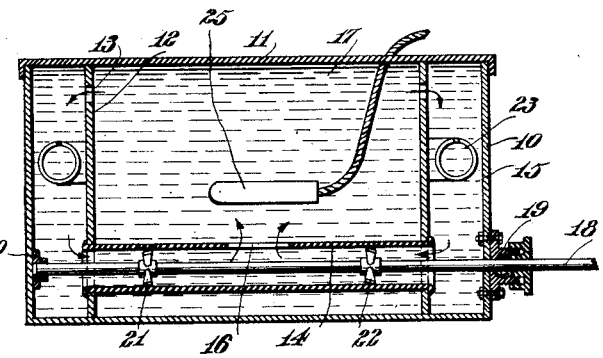
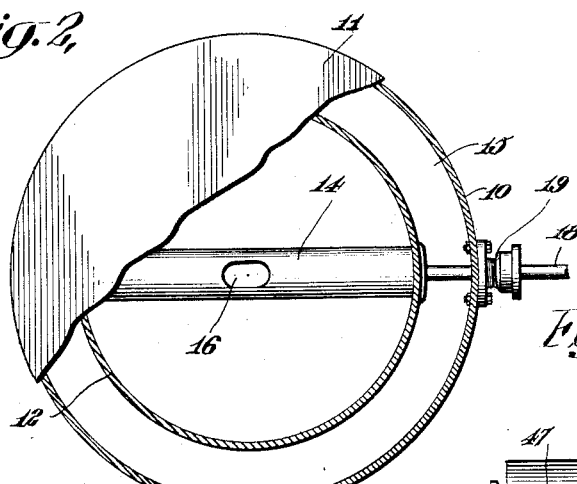
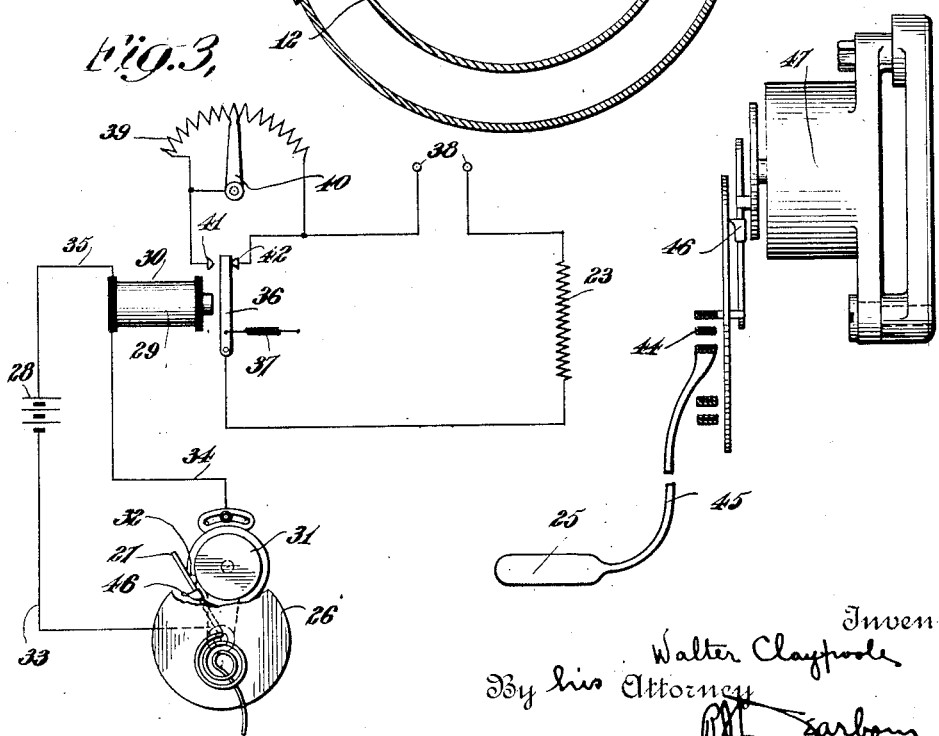

1,442,858

UNITED STATES PATENT OFFICE.

WALTER CLAYPOOLE, OF FOREST HILLS, LONG ISLAND, NEW YORK, ASSIGNOR TO THE TEXAS COMPANY, OF NEW YORK, N. Y., A CORPORATION OF TEXAS.

ADJUSTABLE TEMPERATURE BATH FOR VISCOSIMETERS.

Application filed October 27, 1919. Serial No. 333,735.

*To all whom it may concern:*

Be it known that I, WALTER CLAYPOOLE, a subject of the Crown of Great Britain, and a resident of Forest Hills, Long Island, county of Queens, and State of New York, have invented certain new and useful Improvements in Adjustable Temperature Bath for Viscosimeters, of which the following is a specification, reference being had to the accompanying drawings forming a part thereof.

My invention relates to means for maintaining a body of liquid at any desired constant temperature for any suitable purpose such as viscosimeter bath.

One object of my invention is to provide a constant temperature liquid bath which shall be automatically regulated, to very accurately and closely maintain the temperature throughout the entire body of liquid in the bath at the desired constant.

Another object of my invention is to provide simple and improved apparatus for containing a body of liquid constituting a constant temperature bath as above described, for supplying heat to the liquid, for circulating the liquid in the bath to insure a uniform distribution of heat, and for indicating and automatically regulating the temperature at which the bath is maintained.

In order that my invention may be thoroughly understood I will now proceed to describe the same in the following specification, and will then point out the novel features thereof in appended claims.

Referring to the drawings:

Figure 1 is a partially diagrammatic view of a viscosimeter bath system arranged and constructed in accordance with my invention and constituting one embodiment thereof.

Figure 2 is a partially sectional plan view of the bath.

Figure 3 is a simple diagram showing the circuits for the same system.

Figure 4 is a side elevation of the apparatus shown in Figure 3.

Like parts are designated by the same reference characters in all the figures.

In the drawings, 10 designates a receptacle which may be of any suitable form but preferably that of a dish or container with cylindrical walls and a removable lid or cover 11. Within the receptacle 10 is an inner cylindrical spacing member or partition 12 which is somewhat smaller in diameter than the receptacle 10 and is preferably concentric therewith. It has a series of openings 13 near the top, and a transverse tube or pipe 14 extends across it near the bottom.

The tube is closed into the side walls of the partition at its ends and forms a passage between diametrically opposite points in the annular chamber 15 which is formed between the walls of the receptacle 10 and the partition walls 12. There is an opening 16 in the tube 14 near its center which permits liquid to flow from the tube or pipe 14 into the bath 17 which is established within the partition wall 12.

A shaft 18 extends through a suitable stuffing box bearing 19 through the tube 14 and is supported at its inner end by a bearing 20. The shaft is not sufficiently large to close the passage through the pipe or tube 14 but supports a pair of propellers 21—22 which are oppositely pitched and are on opposite sides of the opening 16. The arrangement is such that when the shaft 18 is driven by a small electric motor (not shown) or other suitable means, the fluid is pumped into it from the annular chamber 15 through the tube 14 and is discharged through the opening 16 into the bath 17. The liquid flows out of the bath 17 through the openings 13 and a circulation of liquid is completed downward through the annular chamber 15 and inward through the tube.

Disposed in the annular chamber is an electric heater 23 which is preferably annular in form and serves to warm the liquid in the annular chamber.

Extending into the bath 17 is a bulb 25 of a thermal recorder. The recorder is shown in Figure 3 and comprises a record sheet 26, and a recording pen or stylus 27 which is actuated in response to temperature variations at the bulb 25 by a well known expandible spiral 44 connected with the bulb by a capillary tube 45.

The pen or stylus carries a contact finger 46 and is connected in a relay circuit which includes a source of energy such as a battery 28, a winding 29 of a relay magnet 30, an adjustable rotary or disc contact 31 which is mounted close to the record disc of the recorder and cooperates with the contact finger 46 which is mounted on the pen or stylus 27.

The rotary or disc contact 31 is driven by any suitable means such as a clock mechanism indicated at 47 and by reason of its movement insures a perfect contact with the finger 46. A non-rotatable contact may of course be used if desired but in any event it is preferably adjustable to permit of its being set for the desired temperature.

When the contacts 31 and 46 are in engagement, which occurs at the predetermined temperature desired, the relay circuit is established from the battery 28 through conductor 33, contacts 32 and 31, conductor 34, relay winding 29 and conductor 35, to the opposite terminal of the battery. The relay coil, when energized, swings a contact arm 36 in opposition to a spring 37 and introduces resistance into the main heating circuit. This main circuit is supplied with energy from any suitable source which is indicated by the terminals 38 and includes the electric heater 23, an adjustable resistance, or rheostatic controller 39, having an adjustable contact arm 40, a pair of fixed contacts 41—42 which are connected to the terminals of the adjustable resistance, and the movable contact arm 36.

A spring holds the contact 42 in engagement with contact 41, thus short-circuiting the resistance 39. When the relay is energized however, the contact 36 moves out of engagement with the contact 42 and may thus interrupt the heating circuit. I prefer however that it shall furthermore move into engagement with the contact 41 thus completing the circuit through the adjustable resistance 39.

The contact member 31 is adjusted on the recorder drum to correspond with the temperature desired to be maintained in the bath. The heating coil as long as it is connected in circuit tends to increase the temperature in the bath. As soon as the bath reaches the desired temperature the heating circuit is either interrupted so that the bath is allowed to cool, or modified by the introduction of the resistance 39 which cuts down the heat generated in the heater 23 so that it may merely maintain the temperature constant by compensating for the radiation losses.

The resistance 39 may be adjusted by moving the rheostatic control arm 40 so as to insure that the desired conditions obtain. The speed at which the shaft 18 is driven may also be varied, making the circulation sufficiently slow or fast to produce the best results.

What I claim is:

1. A container for a body of liquid having an inner chamber formed therein with spaced inlet and discharge openings, means for varying the temperature of the liquid in the container outside of the chamber, mechanical means for circulating the liquid through the inner chamber, and means for automatically regulating the heat varying means to maintain the temperature of the liquid within the inner chamber substantially constant.

2. A container for a body of liquid having an inner chamber formed therein with spaced inlet and discharge openings, means for varying the temperature of the liquid in the container outside of the chamber, mechanical means for circulating the liquid through the inner chamber and an automatic regulator, dependent upon slight variations from a predetermined temperature of the liquid within the inner chamber, for governing the temperature varying means.

3. A container for a body of liquid having an inner chamber formed therein, means for varying the temperature of the liquid in the container outside of the chamber, mechanical means for circulating the liquid through the inner chamber, and an automatic regulator, dependent upon slight variations from a predetermined-temperature of the liquid within the inner chamber, for governing the temperature varying means.

4. A container for a body of liquid having an inner chamber formed therein, a heater in the liquid outside of the chamber, and automatic means responsive to slight variations in the temperature in the liquid in the inner chamber for regulating the heater.

5. A container for a body of liquid having an inner chamber formed therein with spaced inlet and discharge openings, an electric heater in the liquid outside of the inner chamber, and means for recording the temperature of the liquid within the inner chamber and for regulating the electric heater in response to variations thereof.

6. A viscosimeter bath comprising a liquid container having an inner chamber formed therein, a pipe extending through the inner chamber and having an opening communicating with the inner chamber, discharge openings spaced from the inlet opening, and means for causing liquid to flow through the pipe into the inner chamber and circulate therethrough and out of the discharge openings.

7. A viscosimeter bath comprising a liquid container having an inner chamber formed therein, a pipe extending through the inner chamber and having an opening communicating with the inner chamber, discharge openings spaced from the inlet opening and propellers in the pipe on opposite sides of the opening therein for forcing the oil through said opening to cause a circulation through the inner chamber.

8. A viscosimeter bath comprising a fluid container having an inner chamber formed therein and arranged to provide an outer annular chamber, an electric heater disposed in the outer annular chamber and mechanical means for establishing a continuous circulation of a liquid through the inner and outer chambers.

9. A viscosimeter bath comprising a fluid container having an inner chamber formed therein and arranged to provide an outer annular chamber, an electric heater disposed in the outer annular chamber, mechanical means for establishing a continuous circulation of liquid through the inner and outer chambers, and means for regulating the electric heater.

10. A viscosimeter bath comprising a fluid container having an inner chamber formed therein and arranged to provide an outer annular chamber, an electric heater disposed in the outer annular chamber, means for establishing a continuous circulation of liquid through the inner and outer chambers, and means for automatically regulating the electric heater in response to the temperature variations in the inner chamber.

11. A viscosimeter bath comprising a fluid container having an inner chamber formed therein and arranged to provide an outer annular chamber, an electric heater disposed in the outer annular chamber, means for establishing a continuous circulation of liquid through the inner and outer chambers, a controller for governing the electric heater and an automatic regulator responsive to temperature variations in the inner chamber for actuating the controller.

12. A viscosimeter bath comprising a fluid container having an inner chamber formed therein and arranged to provide an outer annular chamber, an electric heater disposed in the outer annular chamber, mechanical means for establishing a continuous circulation of liquid through the inner and outer chambers, a switch for interrupting the heater circuit and an automatic regulator dependent upon temperature variations in the inner chamber for actuating the switch.

In witness whereof, I have hereunto set my hand this 20th day of October 1919.

WALTER CLAYPOOLE.